UNITED STATES PATENT OFFICE.

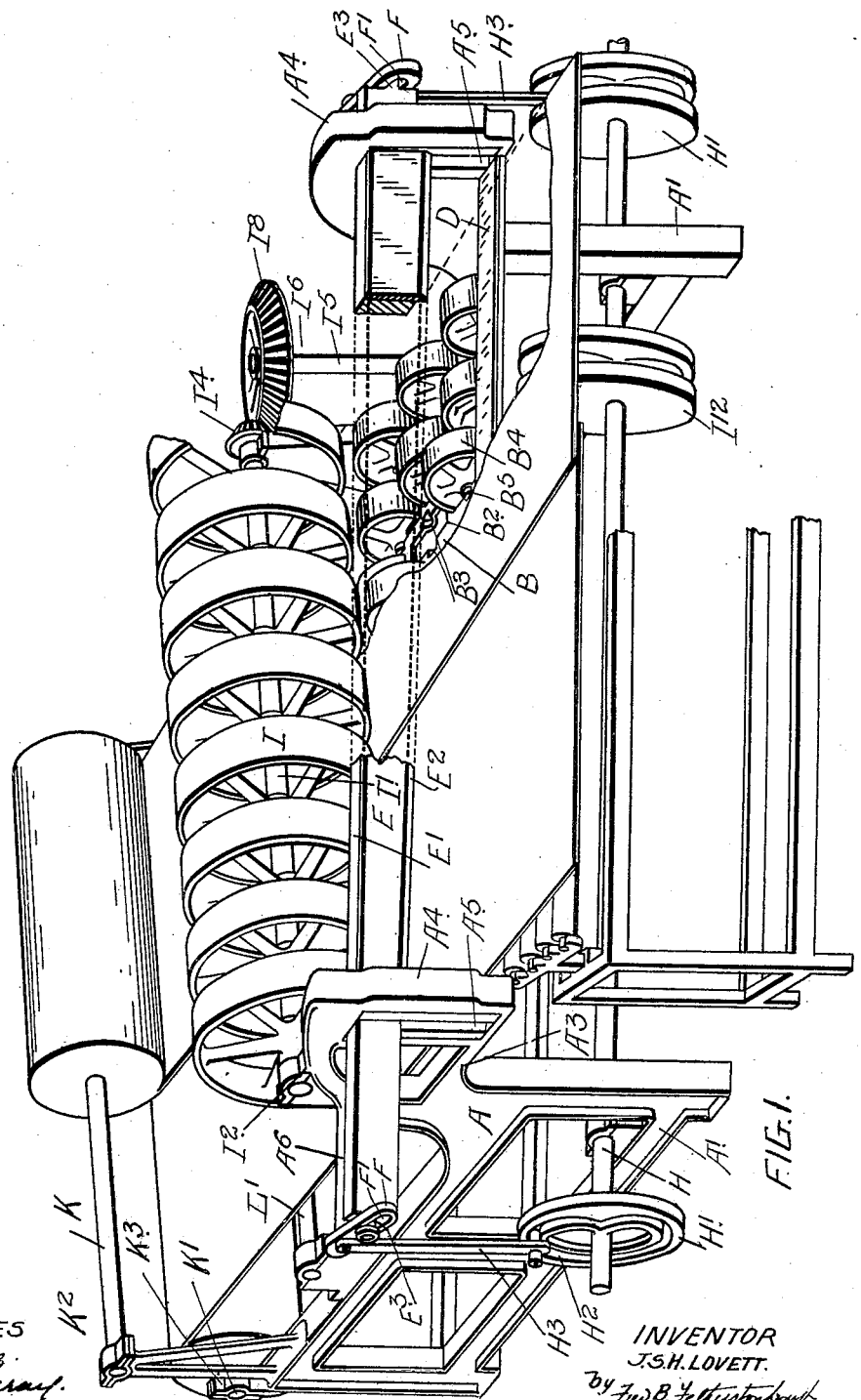

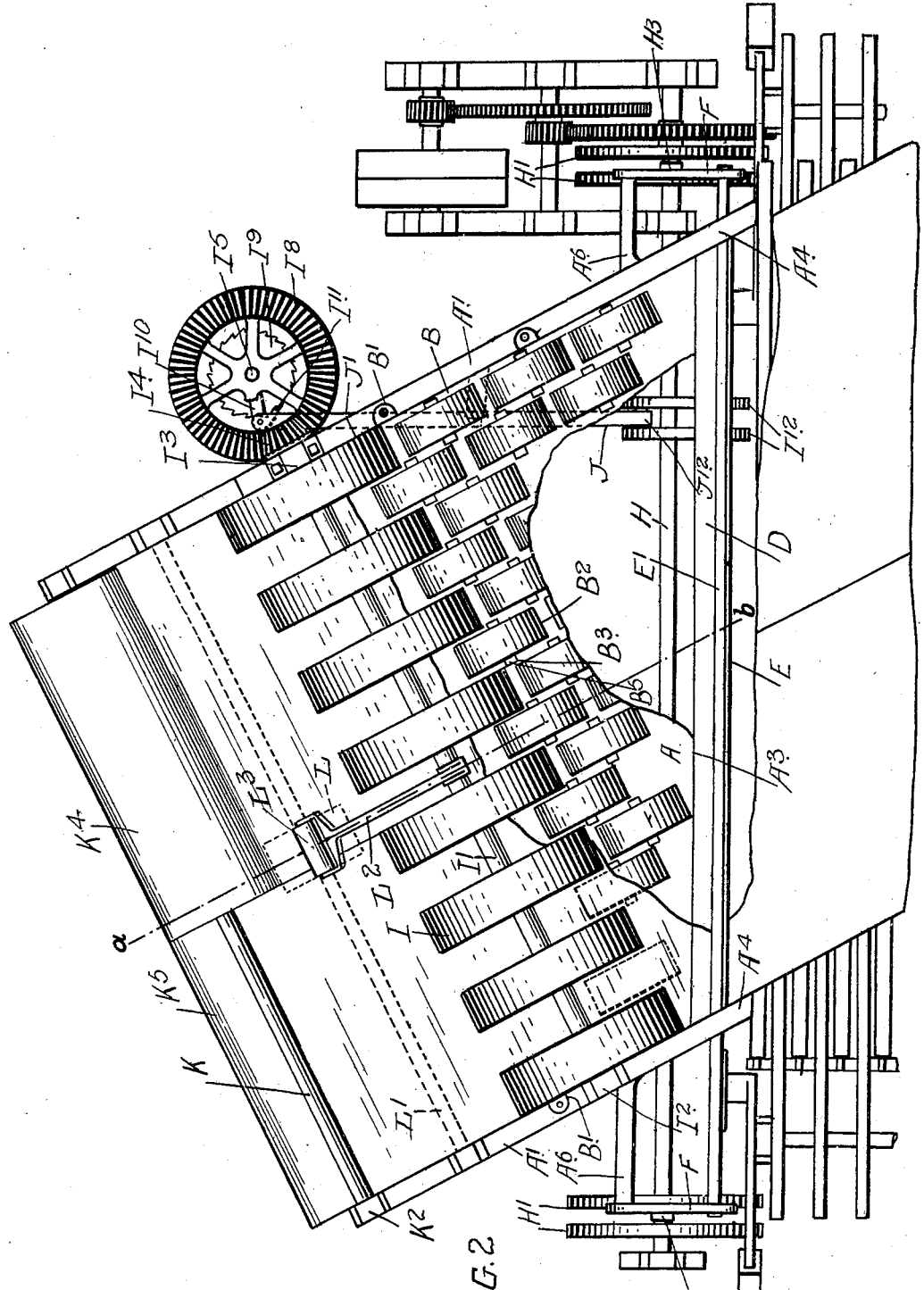

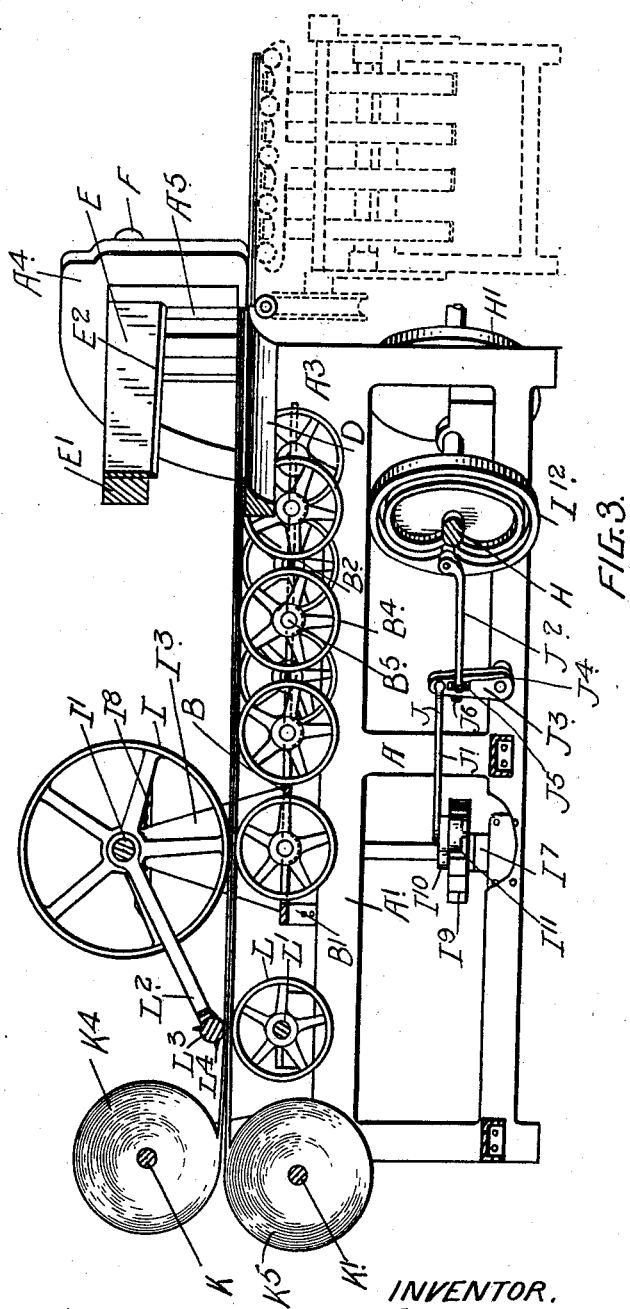

JOSEPH S. H. LOVETT, OF TRENTON, NEW JERSEY, ASSIGNOR OF ONE-THIRD TO THEODORE PESSINGER PAYNE, OF NEWARK, NEW JERSEY, AND ONE-THIRD TO WILLIAM WALLACE NEAR, OF TORONTO, CANADA.

HOSE-MAKING MACHINE.

No. 902,308.      Specification of Letters Patent.      Patented Oct. 27, 1908.

Application filed November 20, 1907. Serial No. 403,103.

To all whom it may concern:

Be it known that I, JOSEPH SCHENCK HOOKER LOVETT, of the city of Trenton, in the county of Mercer, in the State of New Jersey, one of the United States of America, have invented certain new and useful Improvements in Hose-Making Machines, of which the following is the specification.

My invention relates to improvements in duck or canvas preparing machines for hose making machines, and the object of my invention is to devise a simple machine whereby the canvas used in hose making machines may be cut or prepared expeditiously and it consists essentially of a feed table formed with idler rollers supported in a bed formed by the top of the feed table, a ledger plate extending across the end of the table at an angle thereto and on a level with the top of the idler rollers, vertical guide ways extending up from the table and from each end of the ledger plate, a cutting blade extending between the guide ways coacting with the ledger plate, suitable mechanism for imparting a vertical movement to the knife, upper and lower cross shafts extending across the opposite end of the machine and on which the rolls of canvas are held so as to have overlapping edges and pressure rollers designed to force the overlapping edges together, feed rollers coacting with the idler rollers to feed the canvas to the knife, and a suitable drive for the rollers designed to feed the canvas forward to the knife a predetermined distance after each operation of the knife as hereinafter more particularly described by the following specification.

Figure 1, is a general perspective view of my machine. Fig. 2, is a plan view of Fig. 1. Fig. 3, is a longitudinal section on line $a$—$b$, Fig. 2.

In the drawings like letters of reference indicate corresponding parts in each figure.

A is the feed table formed by the side castings A′ suitably connected together.

B is a plate provided with feet B′ secured by bolts to the top of the side castings A′. The plate B forms the top of the feed table and is provided with the openings $B^2$ to each side of which are the journal recesses $B^3$.

$B^4$ are idler rollers provided with central studs $B^5$ which lie in the recesses $B^2$ and $B^3$, thereby journaling the rollers loosely on the table. One end $A^3$ of the table terminates at an angle to the opposite end.

D is a ledger plate which extends across the end $A^3$ in a level with the top of the idler rollers $B^4$. The ledger plate is suitably secured at each end to the side castings A′. To each end of the ledger plate the castings A′ are provided with upward extensions $A^4$ in which are formed vertical guideways $A^5$.

E is the cutting knife, the knife bar E′ of which extends through the guide ways $A^5$ in the extensions $A^4$.

$E^2$ is the cutting blade, the edge of which inclines downwardly from one end to the other thereby coacting with the ledger plate to sever the canvas with a shearing cut.

The knife bar E′ is provided with projecting studs $E^3$.

$A^6$ are projections extending from the projections $A^4$ of the side castings A′.

F are levers pivotally connected to the ends of the projections $A^6$. The levers F are provided with slots F′ through which extend the studs $E^3$, the studs being secured in the slots by collars secured to the outer end of the studs.

H is the main driving shaft.

H′ are cams secured to the shaft H and preferably formed double and having oppositely situated cam grooves $H^2$.

$H^3$ is a link bar having cam rollers coacting with the grooves. The link bar $H^3$ is pivotally connected to the levers F in close proximity to the pivot points of the levers. As the cam revolves it imparts a vertical movement to the knife bar.

I are the feeding rollers which are mounted on the shaft I′ journaled in the bearings $I^2$ and $I^3$.

$I^4$ is a bevel pinion secured to one end of the shaft I′.

$I^5$ is a vertical shaft supported on the bearings $I^6$ and $I^7$ and provided at the top with a bevel gear $I^8$ meshing with the pinion $I^4$.

$I^9$ is a ratchet wheel secured to the shaft $I^5$.

$I^{10}$ is a rock arm swung on the shaft $I^5$ and provided with a pawl $I^{11}$ designed to engage with the ratchet $I^9$.

$I^{12}$ is a cam mounted on the shaft H and similar to the cams H′.

J is a divided link, one member being pivotally connected to the rock arm I¹⁰ and the other member J² being provided with a cam roller coacting with the cam I¹².

J³ is an intermediate lever (see Fig. 3) pivoted at its lower end to one of the side castings A'. To the upper end of the lever J² is pivotally secured the member J'.

J⁴ is a slot formed in the lever in which is secured by a block J⁵ by a set screw J⁶. To the block J⁵ is pivotally secured the member J². By moving the block J⁵ in the slot J⁴ the throw of the link may be varied to enable the ratchet and pawl to increase or decrease the feed as desired.

K and K' are upper and lower shafts journaled in bearings K² and K³. K⁴ and K⁵ are rolls of canvas secured thereon, one to either side of the machine. The inner edges of the roll are arranged to overlap one another, such edges being coated with cement. The means by which the cement is laid on the canvas, I do not describe as it forms no part of my present invention.

L is a roller mounted on the cross shaft L'. The lapped edges of the canvas are supported by and ride over the roller L.

L² is an arm swung on the shaft L' and provided with a forked lower end in which is journaled the roller L³ designed to bear upon the lapped edges of the canvas and press them together. The roller L³ is provided with spikes L⁴ which serve to hold the lapped edges together and hold them in proper position as the cemented portions are pressed together.

Having described the principal parts involved in my invention I shall briefly describe the operation of the same. The rolls of canvas being lapped as shown are fed forwardly by the feed rollers I in an inclined direction to the ledger plate, D, over which it passes onto a suitable supporting table. When the desired amount of material has been fed over the ledger plate the knife E descends to sever the canvas. The severed piece is then conveyed away by suitable means and the feed of the canvas repeated.

From the description it will be seen that I have devised a very simple machine whereby the canvas may be cut expeditiously and prepared ready to pass to the hose making machine.

Although I show a cam drive for operating the feed and the knife it will be readily seen the same might be operated by a steam or air cylinder with equal facility.

What I claim as my invention is:

1. A machine of the character described, comprising a main frame, a ledger plate, a coacting cutting blade, a feed table extending horizontally therefrom and at an angle thereto, supporting rollers for the canvas, feed rollers mounted on a suitable shaft, a main driving shaft, a cam mounted thereon, a vertical shaft, gears connecting such shaft to the shaft supporting the feed rollers, a ratchet on the vertical shaft, a rock arm and pawl engaging the ratchet and a link connecting the rock arm to the cam as and for the purpose specified.

2. In a machine of the character described, the combination with the feed table, ledger plate and coacting knife, of rotatable shafts designed to hold rolls of canvas in a lapped position, feed rollers mounted on a suitable shaft, a supporting roller for the lapped edges of the canvas, an arm swung on the feed roller shaft and having forked lower end and a spiked roller journaled in the forks and designed to press upon the lapped edges of the canvas as and for the purpose specified.

3. In a machine of the character described, the combination with the ledger plate, and the cutting table having vertical guide ways located at each end of the ledger plate, of a knife bar extending through the guide ways, a lever pivoted at one end to a suitable portion of the frame and having a slot at the other end through which a portion of the knife bar extends, a depending link bar pivotally connected to the lever and means for imparting a vertical movement thereto as and for the purpose specified.

4. In a machine of the character described, the combination with the ledger plate, and the cutting table having vertical guide ways located at each end of the ledger plate, of a knife bar extending through the guide ways, a lever pivoted at one end to a suitable portion of the frame and having a slot at the other end through which a portion of the knife bar extends, a depending link bar pivotally connected to the lever and a grooved cam suitably mounted and driven and rollers at the lower end of the link bar coacting with the groove in the cam as and for the purpose specified.

JOSEPH S. H. LOVETT.

Witnesses:
B. BOYD,
R. COBAIN.